United States Patent
VanOudenhoven

(10) Patent No.: US 12,031,056 B2
(45) Date of Patent: Jul. 9, 2024

(54) WATER-BASED INKS WITH RENEWABLE MATERIALS

(71) Applicant: SUN CHEMICAL CORPORATION, Parsippany, NJ (US)

(72) Inventor: Guy VanOudenhoven, Menasha, WI (US)

(73) Assignee: Sun Chemical Corporation, Parsippany, NJ (US)

( * ) Notice: Subject to any disclaimer, the term of this patent is extended or adjusted under 35 U.S.C. 154(b) by 961 days.

(21) Appl. No.: 16/981,583

(22) PCT Filed: Mar. 20, 2019

(86) PCT No.: PCT/US2019/023076
§ 371 (c)(1),
(2) Date: Sep. 16, 2020

(87) PCT Pub. No.: WO2019/190842
PCT Pub. Date: Oct. 3, 2019

(65) Prior Publication Data
US 2021/0017418 A1 Jan. 21, 2021

Related U.S. Application Data

(60) Provisional application No. 62/648,425, filed on Mar. 27, 2018.

(51) Int. Cl.
| | |
|---|---|
| *C09D 177/00* | (2006.01) |
| *C08K 3/26* | (2006.01) |
| *C09D 11/037* | (2014.01) |
| *C09D 11/102* | (2014.01) |
| *C09D 11/50* | (2014.01) |

(52) U.S. Cl.
CPC .......... *C09D 177/00* (2013.01); *C09D 11/037* (2013.01); *C09D 11/102* (2013.01); *C09D 11/50* (2013.01); *C08K 3/26* (2013.01); *C08K 2003/265* (2013.01)

(58) Field of Classification Search
CPC .................................................. C09D 177/00
See application file for complete search history.

(56) References Cited

U.S. PATENT DOCUMENTS

| | | | |
|---|---|---|---|
| 4,514,540 A | 4/1985 | Peck | |
| 4,973,617 A | 11/1990 | Incontro et al. | |
| 5,066,331 A | 11/1991 | Hunter et al. | |
| 5,095,058 A | 3/1992 | Smith et al. | |
| 5,994,494 A | 11/1999 | Wakui | |
| 6,077,900 A | 6/2000 | Boudreaux et al. | |
| 6,517,619 B1 * | 2/2003 | Nowak .................. | C09D 11/17 106/31.86 |
| 6,518,334 B1 | 2/2003 | Calhoun et al. | |
| 7,723,402 B2 * | 5/2010 | Tucker .................. | C09D 11/30 523/160 |
| 8,809,429 B2 | 8/2014 | Aze et al. | |
| 2009/0317549 A1 * | 12/2009 | Tan ........................ | D21H 21/16 162/135 |

FOREIGN PATENT DOCUMENTS

| | | | |
|---|---|---|---|
| CN | 104 277 584 A | 1/2015 | |
| CN | 103450737 B | 7/2015 | |
| CN | 107 815 192 A | 3/2018 | |
| EP | 0877063 A1 | 11/1998 | |
| JP | S60-092327 A | 5/1985 | |
| JP | H11-032310 A | 2/1999 | |
| JP | 2001-506310 A | 5/2001 | |
| JP | 2018-012744 A | 1/2018 | |
| WO | WO-9827162 A1 * | 6/1998 | .............. C08L 33/00 |

OTHER PUBLICATIONS

Japanese Office Action issued in counterpart JP Application No. 2020-547100, mailed Feb. 27, 2023 with English language translation.
Chinese Office Action (Decision of Rejection) issued in counterpart CN Application No. 201980022783.4, mailed Jan. 13, 2023 with English language translation.
International Search Report issued in International Application No. PCT/US19/023076, mailed Jun. 6, 2019.
Written Opinion of the International Searching Authority issued in International Application No. PCT/US19/023076, mailed Jun. 6, 2019.
International Preliminary Report on Patentability (Chapter 1 of the Patent Cooperation Treaty) issued in International Application No. PCT/US19/023076, mailed Mar. 27, 2020.
European Search Report issued in couterpart EP Application No. EP 19 77 5613, mailed May 6, 2021.
Indian Examination Report issued in counterpart Indian Application No. 202047037871, mailed Jan. 31, 2022.
Chinese Office Action issued in counterpart CN Application No. 201980022783.4, mailed Mar. 3, 2022.
Chinese Office Action issued in counterpart CN Application No. 201980022783.4, mailed Aug. 22, 2022 with English language translation.
Taiwan Office Action issued in counterpart TWApplication No. 108110287, mailed Nov. 4, 2022 with English language translation.

\* cited by examiner

*Primary Examiner* — Michael F Pepitone
(74) *Attorney, Agent, or Firm* — Marian E. Fundytus; Ostrolenk Faber LLP.

(57) ABSTRACT

Described herein are water-based varnishes and inks that include a high renewable carbon content polyamide in an aqueous dispersion and a water-insoluble particulate material. The inks and varnishes exhibit stable viscosity, that is, they are varnishes and inks that exhibit little to no viscosity change over an extended period of time. Further, the inks and varnishes exhibit little to no settling of the insoluble particulate material over an extended period of time. The water-based varnishes include an aqueous polyamide resin dispersion and an additive selected from a water-insoluble particulate material, and the polyamide resin has a renewable carbon content of ≥50 wt %.

20 Claims, No Drawings

WATER-BASED INKS WITH RENEWABLE MATERIALS

CROSS REFERENCE TO RELATED APPLICATIONS

The present application is a § 371 National Phase application based on PCT/US19/023076 filed Mar. 20, 2020, which claims the benefit of U.S. Provisional Application No. 62/648,425, filed Mar. 27, 2018 the subject matter of each of which is incorporated by reference in their entirety.

BACKGROUND OF THE INVENTION

Water-based inks often contain materials that are water-insoluble, such as particulate materials. Over time, water-insoluble materials may settle out of the ink, forming sediment at the bottom of the container. Settling may take place between the time of manufacture and printing. Water insoluble particulate materials that may be prone to settling include high molecular weight polysaccharides (e.g. starches, modified starches, modified polysaccharides, which are greater than 10% insoluble in water at 25° C. and/or which exceed the density of water), pigments, and fillers such as calcium carbonate.

Water-based polyurethanes have been included in ink compositions in order to limit the amount of settling of such particulate components. In addition to starches and other polysaccharides, pigments and fillers such as calcium carbonate are known to be susceptible to settling. In addition to polyurethanes, water-soluble polyamides have been used as anti-settling agents.

While water-soluble polyamides have been used in water-based ink formulations, they exhibit a high acid number ($\geq 100$ mgKOH/g). High acid content of water-soluble polyamides lowers the R—N—H content available for intermolecular hydrogen bonding with the polysaccharide, and as a result these agents are not as effective at preventing settling. On the other hand, solvent based polyamides typically have a low acid number ($\leq 10$ mgKOH/g).

A disadvantage that arises from the inclusion of polyurethanes is delayed final viscosity, which interferes with optimal color matching and production viscosity reporting. An ink at 20/seconds viscosity, such as measured with a #2 Signature Zahn cup, will have a dissimilar color to that same ink as the viscosity increases to 28/seconds. Water based polyurethanes perform well as anti-settling agents. However, polyurethane viscosity gain occurs in water-based emulsions, which contain high molecular weight emulsion polymers with a structure similar to a ball of yarn. If the emulsion remains compact, viscosity is maintained. However, water-based polyurethane structures are mobile and the high molecular weight yarn-like structure can unwrap in water-based emulsions, penetrating to the inner layers. The polymer then becomes a long expansive string, making many more (viscosity increasing) possible interactions available. In contrast, an aqueous water insoluble dispersion polyamide is inflexible and compact and does not have the ability to be penetrated and unravel.

Another disadvantage associated with polyurethanes, and other acrylic polymeric materials used as ink ingredients in the state of the art is that they are produced from fossil fuel supplies, which depletes the earth's natural resources and pollute the environment, and which contribute to increased greenhouse gas emissions.

In recent years, inks and coatings formulators and those industries which use ink and coating products have been moving towards environmentally friendly approaches to contending with greenhouse gas emissions and when possible, avoiding populating landfills with single-use carbon products. Many of the components used in ink and coating products are carbon-based. A more environmentally friendly approach in which organic components produced from renewable carbon sources are included in ink and coating products would be advantageous.

There is a long felt need for high bio-renewable content (BRC) alternatives to (fossil derived acrylic resins) in the aqueous printing ink industry. High biorenewable content materials contain a renewable carbon content of $\geq 50$ wt % in dried and cured films. Preferably, BRC is $\geq 75$ wt %.

SUMMARY OF THE INVENTION

Described herein are water-based varnishes and inks that include a high renewable carbon content solvent-soluble polyamide in an aqueous dispersion and a water-insoluble particulate material. The inks and varnishes exhibit stable viscosity, that is, they exhibit little to no viscosity change over an extended period of time. Further, the inks and varnishes exhibit little to no settling of the insoluble particulate material over an extended period of time.

The water-based varnishes include an aqueous polyamide resin dispersion, and an additive selected from a water-insoluble particulate material, wherein the polyamide resin has a renewable carbon content of $\geq 50$ wt % and the ink exhibits little settling or acceptable settling of the water-insoluble particulate material. Inks can be prepared from the varnishes by further including a colorant, such as a pigment. The pigment may be water-insoluble particulate material.

In one aspect, little settling or acceptable settling is determined in accordance with the settling test described herein.

In another aspect, the water-based inks and varnishes further include an acrylate polymer.

In another aspect, the polyamide resin of the aqueous polyamide resin dispersion included in the water-based inks and varnishes is soluble in alcohol or a co-solvent blend of alcohol and a hydrocarbon, such as a co-solvent blend of 50 wt % to 90 wt % alcohol and 10 wt % to 50 wt % hydrocarbon.

In another aspect, the polyamide resin of the aqueous polyamide resin dispersion included in the water-based inks and varnishes is soluble in $C_2$ to $C_6$ alcohol.

In another aspect, the polyamide resin of the aqueous polyamide resin dispersion included in the water-based inks and varnishes has a solids content of 30 wt % to 60 wt %, preferably 35 wt % to 55 wt %, more preferably 40 wt % to 50 wt %.

In another aspect, the polyamide resin of the aqueous polyamide resin dispersion included in the water-based inks and varnishes has a pH at 25° C. of 6.5 to 9.5, preferably 7.0 to 9.0, more preferably 7.5 to 8.5.

In another aspect, the polyamide resin of the aqueous polyamide resin dispersion included in the water-based inks and varnishes has a viscosity of 300 cps to 20,000 cps, preferably 375 cps to 575 cps, more preferably 425 cps to 525 cps (Brookfield#3 at 20° C. and 50 rpm).

In another aspect, the polyamide resin of the aqueous polyamide resin dispersion included in the water-based inks and varnishes has an average particle size of 0.15 microns to 0.40 microns, preferably 0.20 microns to 0.40 microns, more preferably 0.25 microns to 0.35 microns.

In another aspect, the water-insoluble particulate material is any ink additive that is prone to settling and contains available oxygen for hydrogen bonding.

In another aspect, the water-insoluble particulate material included in the water-based inks and varnishes is a polysaccharide, calcium carbonate, a pigment and mixtures thereof.

In another aspect, the water-insoluble particulate material included in the water-based inks and varnishes is a starch.

In another aspect, the water-insoluble particulate material included in the water-based inks and varnishes is an oxidized starch.

In another aspect, the polyamide resin of the aqueous polyamide resin dispersion included in the water-based inks and varnishes has a renewable carbon content of 50 wt % to 99 wt %, preferably 60 wt % to 99 wt %, more preferably 70 wt % to 99 wt %, still more preferably 80 wt % to 99 wt %.

In another aspect, the renewable carbon content of the polyamide resin of the aqueous polyamide resin dispersion is based on the total carbon present in a sample of the aqueous polyamide resin dispersion in which the amount of renewable carbon is determined in accordance with ASTM D6866-18 Method B (AMS) using MST Standard Reference Material (SRM) 4990C.

In another aspect, the colorant included in the water-based ink is a phosphorescent pigment. Such phosphorescent pigments may be water insoluble and may be prone to settle over time in a manner that makes it difficult, if not impossible, to re-mix the ink formulation.

In another aspect, the colorant included in the water-based ink is a pigment in an acrylic dispersion.

In another aspect, the water-based ink is a flexographic or gravure printing ink.

In another aspect, the water-based varnish or ink maintains a reduced viscosity of 18/seconds to 60/seconds for at least 70 days, as measured with a #2 Signature Zahn cup at 70° F., with the ink or varnish sample stored in a 4 ounce glass jar and shaken for 30 seconds before viscosity is determined.

In another aspect, the water-based varnish or ink the ink or varnish is substantially free of settling for at least 14 days, preferably for at least 50 days, more preferably for at least 70 days, and even more preferably for at least 90 days, and still even more preferably, one year.

In another aspect, the water-based varnish or ink exhibits a viscosity increase of ≤10% from 1 hour after formulation to 70 days after formulation.

In another aspect, the water-based varnish or ink exhibits a viscosity increase of ≤5% viscosity from 1 hour to 70 days.

In another aspect, a printed article is prepared from the water-based varnishes or inks described herein, the printed article comprising a substrate printed with said water-based varnishes or inks.

The polyamide material contained in an aqueous dispersion is one having high renewable carbon content. One commercially available aqueous polyamide resin dispersion that fulfills this criteria are the SNOWPACK™ 2362A and SNOWPACK™ 2632E products, sold by Lawter, Inc. SNOWPACK™ 2362A and SNOWPACK™ 2632E are aqueous polyamide dispersions in which the polyamide resins therein have high renewable carbon content. These materials can be used alone in ink formulations or in combination with acrylic emulsions. The SNOWPACK products exhibit a pH at 25° C. of 6.5 to 9.5, preferably 7.0 to 9.0, more preferably 7.5 to 8.5. They further exhibit a viscosity of 300 cps to 20,000 cps, preferably 375 cps to 575 cps, more preferably 425 cps to 525 cps (Brookfield #3 at 20° C. and 50 rpm). Still further, they have an average particle size of 0.15 microns to 0.40 microns, preferably 0.20 microns to 0.40 microns, more preferably 0.25 microns to 0.35 microns. Further, the SNOWPACK™ materials are alcohol soluble, that is, soluble in a $C_2$ to $C_6$ alcohol. The polyamide resin present in the Snowpack dispersion is insoluble in water and in water-based inks and varnishes in the pH range of anionic printing inks and varnishes.

The SNOWPACK™ aqueous polyamide resin dispersions impart similar performance properties to acrylic emulsions when used in water-based printing ink and coating compositions. That is, other properties desired in an ink formulation, such as uniform deposition onto absorbent substrate, non-foaming, pH range, tack, compatibility with color dispersions, carry-up, scuff, anti-blocking, etc., are exhibited by the inks described herein.

The inventive inks represent a green and sustainable alternative to the field of ink and coating supply. One particularly preferred material is SNOWPACK™ 2362A (alternately referred to as 2362E in product literature). SNOWPACK™ 2362A is an alcohol soluble polyamide in an aqueous dispersion, and further may be soluble in an alcohol-hydrocarbon co-solvent mixture. This allows the chemical performance attributes of a heretofore solvent-based resin to be incorporated into water-based inks.

Further, the SNOWPACK™ materials have a renewable carbon content of 50 wt % to 99 wt %, preferably 60 wt % to 99 wt %, more preferably 70 wt % to 99 wt %, still more preferably 80 wt % to 99 wt %., based on the total carbon present in a sample of the SNOWPACK™ aqueous polyamide resin dispersion in which the amount of renewable carbon is determined in accordance with ASTM D6866-18 Method B (AMS) using NIST Standard Reference Material (SRM) 4990C. In one aspect, the SNOWPACK™ 2362A material has a renewable carbon content of 83 wt %.

In addition to providing resistance to the settling of water-insoluble particulate materials, the polyamide resin of the aqueous dispersion stabilizes the viscosity of the ink and varnish formulations. For color matching (1 hour ink age) and for a printer on a flexographic press (75 hours or greater ink age), SNOWPACK™ 2362A does not show an unacceptable delayed final viscosity, e.g., increase in viscosity.

Water-based solution polyamides do not offer the same economic and bio-renewable carbon (BRC) advantages of SNOWPACK™ 2362A. For example, the Casamid polyamide resins available from Thomas Swan are not believed to contain renewable carbon. In contrast, SNOWPACK™ 2362A is reported to have a renewable carbon content of 83 wt %. Water-based solution polyamides are shock prone when used in conjunction with water-based acrylics. To avoid a precipitate, water-based polyamides must be added while combining and mixing with acrylics. In the same circumstance, SNOWPACK™ 2362A can be added without practicing additional steps, which can be time consuming.

When the amount of aqueous polyamide resin dispersion is about 40 wt % or greater based on the total weight of the water-insoluble particulate material contained within the finished ink formula, settling of the water-insoluble polysaccharide does not occur. In one aspect, the amount of aqueous polyamide resin dispersion is 40% to 300% of the water-insoluble particulate material, more preferably 50% to 300% of the water-insoluble particulate material.

Water-based printing inks benefit greatly from use of particulate polysaccharides. In addition to high bio renewable content (BRC), starch provides resistance to scuff and a leveling of topography on absorbent print surfaces. Amounts of water-insoluble particulate greater than or equal to 1.0 wt % show the positive impact on scuff and print quality, up to amounts greater than or equal to 12 wt %.

However, polysaccharides such as starch typically settle in liquid inks. This can cause a settling problem. A layer of polysaccharide residue may form in the bottom of the ink container that is difficult to re-mix into the ink, particularly after the ink has been stored for a long time. The starch may settle into a tightly packed matrix in the bottom surface of the container, particularly when no anti-settling agent is included in the ink. Re-dispersing the polysaccharide requires special equipment that may not be available at many printers.

Polysaccharides, starches, and other water insoluble particulate components of water-based printing inks settle and pack on the bottom of containers, particularly when densities are greater than 1.0 grams/ml. While not wishing to be bound by any theory, it may be that the nitrogen found in the solvent soluble polyamide material present in the ink or varnish forms hydrogen bonds with oxygen present in the molecules of the particulate material. The hydrogen bonding interactions de-localize the weight of water-insoluble ink components, which tend to be higher density than other ink components. Due to the presence of the solvent soluble polyamide material, the delocalized water-insoluble particulate materials do not settle or settle to a lesser degree than would be the case if the solvent soluble polyamide material was not present.

The SNOWPACK™ materials described herein (e.g., SNOWPACK™ 2362A) prevents water-insoluble particulate material, such as oxidized water-insoluble starch, from settling in a water-based printing ink through hydrogen bonding as described above, and facilitates delocalization of gravitational forces on the starch particle. The nitrogen atoms of the polyamide resin present SNOWPACK™ 2362A supply the electropositive (hydrogen) requirement of hydrogen bonding and are attracted to the oxygen available within the oxidized starch.

Hydrogen bonding in this context concerns the attraction of second level oxygen electron pairs found in oxygen to the nitrogen-attached hydrogens, which possess a significant positive charge. Within the polyamide, there is a significant amount of R—N—H moieties. Within a polysaccharide or starch structure, there can be a significant amount of oxygen (in the form R—O—H). When starch is oxidized, even more oxygen is available in the starch structure, thus increasing hydrogen bonding that prevents the kind of settling that makes inks and varnishes difficult if not impossible to re-homogenize, e.g., re-disperse settled material into the ink formulation.

Additives may be optionally included in the inks in order to improve and enhance various properties. A partial list of such additives includes, but is not limited to: adhesion promoters, silicones, light stabilizers, de-gassers, waxes, ammonia, flow promoters, crosslinkers, defoamers, antioxidants, stabilizers, surfactants, dispersants, plasticizers, rheological additives, silicones, and others.

When a wax is included in the present ink compositions, it may be an amide wax, erucamide wax, polypropylene wax, polytetrafluorethylene wax, paraffin wax, polyethylene wax, Teflon, carnauba wax and the like.

A crosslinker, when present, may be in the form of a zinc oxide material.

Suitable colorants for the inks of the present invention include, but are not limited to organic or inorganic pigments and dyes. Dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired. Among the above, iron oxides, titanium dioxides, chromium oxides, ferric ammonium ferrocyanides, ferric oxide blacks, and pigment white numbers 6 and 7 are pigments that are prone to settling, due to their relatively high densities. Other inclusions and additives that may be present in the ink formulations include fluorescent non-water soluble pigments, clays, and silicon oxides.

EXAMPLES

The following examples illustrate specific aspects of the present invention. They are not intended to limit the scope thereof, and should not be construed as limiting.

Inventive Examples 1 and 4 and Comparative Examples 2, 3, and 5 are varnishes (also called vehicles). Inventive Examples 1 and 4 include the aqueous polyamide resin dispersion SNOWPACK™ 2362A. Comparative Examples 2 and 5 include all components of Inventive Examples 1 and 2 respectively, except they do not include SNOWPACK™ 2362A.

As can be seen in the data in Table 6, no settling occurs in Inventive Examples 1 and 4, whereas Comparative Examples 2 and 5 exhibit moderate settling after 2 days and severe settling after 90 days.

In Comparative Example 3, SNOWPACK™ 2362A is replaced with Urethane 940-1207, which provides the varnish with anti-settling properties. However, urethanes disadvantageously cause unacceptably large viscosity gains in finished inks.

TABLE 1

Inventive Example 1 - Varnish Containing SNOWPACK ™ 2362A

| Material | % |
| --- | --- |
| Water | 40.7 |
| Ammonium Hydroxide 15% | 3 |
| Monoisopropanolamine | 0.5 |
| Tego 3062 -- a defoamer | 0.3 |
| Acticide LA -- microbiocide algicide and fungicide. | 0.1 |
| Filtrez 531 -- fumaric modified rosin ester, (Lawter) | 4.9 |
| Oxidized corn starch | 11.4 |
| Joncryl ® 662 | 6.4 |
| Polestar ® 400 clay (kaolin) | 0.5 |
| Joncryl ® LMV 7031 | 11.5 |
| Aquabead ® 425E -- anionic carnauba wax emulsion | 14 |
| SNOWPACK ™ 2362A | 5 |
| Foam-A-Tac 2-255-37 | 1.7 |
| Total | 100.0 |

Joncryl ® 662 is an acrylic colloidal emulsion comprising 50% renewable raw materials on solids.
Joncryl ® LMV 7031 is a film forming, low maintenance, pH stable acrylic emulsion.

TABLE 2

Comparative Example 2 - Inventive Example 1 without SNOWPACK™ 2362A

| Material | % |
|---|---|
| Water | 43.0 |
| Ammonium Hydroxide 15% | 3.1 |
| Monoisopropanolamine | 0.5 |
| Tego 3062 | 0.3 |
| Acticide LA | 0.1 |
| Filtrez 531 | 5.2 |
| Oxidized corn starch | 12.0 |
| Joncryl ® 662 | 6.7 |
| Polestar 400 clay | 0.5 |
| Joncryl ® LMV 7031 | 12.1 |
| Aquabead 425E | 14.7 |
| Foam-A-Tac 2-255-37 | 1.8 |
| Total | 100.0 |

TABLE 3

Comparative Example 3 - Inventive Example 1 (SNOWPACK™ 2362A Replaced by Urethane 940-1207)

| Material | % |
|---|---|
| Water | 40.7 |
| Ammonium Hydroxide 15% | 3 |
| Monoisopropanolamine | 0.5 |
| Tego 3062 | 0.3 |
| Acticide LA | 0.1 |
| Filtrez 531 | 4.9 |
| Oxidized corn starch | 11.4 |
| Joncryl ® 662 | 6.4 |
| Polestar 400 clay | 0.5 |
| Joncryl ® LMV 7031 | 11.5 |
| Aquabead 425E | 14 |
| Urethane 940-1207 | 5 |
| Foam-A-Tac 2-255-37 | 1.7 |
| Total | 100.0 |

TABLE 4

Inventive Example 4 - Varnish Containing SNOWPACK™ 2362A

| Material | % |
|---|---|
| Water | 24.6 |
| Ammonium Hydroxide 15% | 2.5 |
| Monoisopropanolamine | 0.5 |
| Tego 3062 | 0.3 |
| Reactol 5145 | 6.3 |
| Oxidized corn starch | 9.7 |
| Joncryl ® LMV 7031 | 26.0 |
| Joncryl ® 74-A | 10.0 |
| Aquabead 425E | 8.0 |
| Zinc Carbonate solution | 3.0 |
| SNOWPACK™ 2362A | 8.0 |
| Foam-A-Tac 2-255-37 | 1.0 |
| Acticide LA | 0.1 |
| Total | 100.0 |

Joncryl ® 74-A is a soft film forming, RC acrylic emulsion.

TABLE 5

Comparative Example 5 - Inventive Example 4 without SNOWPACK™ 2362A

| Material | % |
|---|---|
| Water | 26.8 |
| Ammonium Hydroxide 15% | 2.7 |
| Monoisopropanolamine | 0.5 |
| Tego 3062 | 0.3 |
| Reactol 5145 | 6.8 |
| Oxidized corn starch | 10.5 |
| Joncryl ® LMV 7031 | 28.3 |
| Joncryl ® 74-A | 10.9 |
| Aquabead 425E | 8.7 |
| Zinc Carbonate solution | 3.3 |
| Foam-A-Tac 2-255-37 | 1.1 |
| Acticide LA | 0.1 |
| Total | 100.0 |

Settling, as the term is used herein, is determined by placing a sample of a liquid ink formulation in a sealed 4-ounce jar at room temperature (70° F.) and leaving the sample undisturbed for the time periods set forth in Tables 6, 10, and 12. The liquid ink passes the settling test if, without mixing or shaking of the jar, the sample pours out of the jar, leaving no solid materials on bottom of jar. The liquid ink fails the settling test if, under the same conditions, the solid material remains on the bottom of the container when the ink formulation is poured out.

TABLE 6

Settling Results

| Example | Settling | | |
|---|---|---|---|
|  | 2 Days | 14 Days | 90 Days |
| Inv. Example 1 | no settling | no settling | no settling |
| Comp. Example 2 | moderate settling | severe settling | severe settling |
| Inv. Example 4 | no settling | no settling | no settling |
| Comp. Example 5 | moderate settling | severe settling | severe settling |
| Comp. Example 3 | no settling | no settling | no settling |

As shown in Table 6, inventive vehicles 1 and 4 containing SNOWPACK™ 2362A exhibited no settling, while the comparative examples 2 & 5, not containing SNOWPACK™ 2362A, exhibited severe settling by 14 days after formulation. Comparative Example 3, which contains urethane instead of SNOWPACK™ 2362A, is resistant to settling but exhibits a substantial increase in viscosity over time, as shown below.

Inventive Examples 6-15 were prepared by combining the Inventive Example 1 vehicle with the acrylic pigment dispersions identified in Table 7 to produce inventive inks, suited for example for flexo and gravure printing applications.

Comparative Examples 16-25 were prepared by combining the Comparative Example 3 vehicle (containing polyurethane) with the acrylic pigment dispersions identified in Table 8 below.

TABLE 7

Inventive Examples 6-15:
Inventive Example 1 vehicle (w/SNOWPACK™ 2362A)
Combined with Various Acrylic Dispersions

|  | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Ex. 1 vehicle | 50 | 50 | 50 | 50 | 50 | 50 | 50 | 50 | 50 | 50 |
| Yellow 14 YCD2004 | 50 | | | | | | | | | |
| Yellow 83 YGD8851 | | 50 | | | | | | | | |
| Orange 34 TPQ3034 | | | 50 | | | | | | | |
| Red 2 RCD9930 | | | | 50 | | | | | | |
| Red 22 RFD4241 | | | | | 50 | | | | | |
| Red 57:1 RFD9587 | | | | | | 50 | | | | |
| Blue 15:3 BFD8153 | | | | | | | 50 | | | |
| Green 7 GCD9957 | | | | | | | | 50 | | |
| Violet 23 VFD1157 | | | | | | | | | 50 | |
| Black 7 LAD7590 | | | | | | | | | | 50 |
| Total | 100 | 100 | 100 | 100 | 100 | 100 | 100 | 100 | 100 | 100 |

TABLE 8

Comparative Examples 16-25:
Comparative Example 3 Vehicle (Urethane 940-1207)
Combined with the Acrylic Dispersions of Examples 6-15

|  | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|
| Ex. 3 vehicle | 50 | 50 | 50 | 50 | 50 | 50 | 50 | 50 | 50 | 50 |
| Yellow 14 YCD2004 | 50 | | | | | | | | | |
| Yellow 83 YGD8851 | | 50 | | | | | | | | |
| Orange 34 TPQ3034 | | | 50 | | | | | | | |
| Red 2 RCD9930 | | | | 50 | | | | | | |
| Red 22 RFD4241 | | | | | 50 | | | | | |
| Red 57:1 RFD9587 | | | | | | 50 | | | | |
| Blue 15:3 BFD8153 | | | | | | | 50 | | | |
| Green 7 GCD9957 | | | | | | | | 50 | | |
| Violet 23 VFD1157 | | | | | | | | | 50 | |
| Black 7 LAD7590 | | | | | | | | | | 50 |
| Total | 100 | 100 | 100 | 100 | 100 | 100 | 100 | 100 | 100 | 100 |

The viscosity of the inks of the examples provided in Tables 7 and 8 was adjusted with water to a viscosity of 25 seconds, as determined with a #2 Signature Zahn cup in the manner described above.

The viscosity of inventive ink examples 6-15 of Table 7 was determined: (1) within 1 hour of formulation; (2) after 7 days; and (3) after 70 days in the manner described herein. Inventive ink examples 6-15 maintained a viscosity of 25±2 seconds for the entire 70 day testing period.

The viscosity of comparative ink examples 16-25 of Table 8 was determined within 1 hour of formulation and 24 hours after formulation in the manner described herein. Comparative ink examples 16-25 exhibited a viscosity gain from an initial 25±2/seconds to at least 32/seconds in 24 hours, which is unacceptable for most commercial printers, as it will lead to unacceptable color strength at print viscosity. In quantitative terms, a loss in strength corresponding to a DE>2.0 measured on an X-rite spectrometer or similar is not acceptable.

The acrylic emulsions available under the trade names Joncryl® LMV 7031, Joncryl® 74-A and Joncryl® 662 are used in the inventive examples in combination with SNOW- PACK™ 2362A. The examples further contain a polysaccharide and/or modified polysaccharide. The anti-settling influence of SNOWPACK™ 2362A upon the water-insoluble polysaccharide material is demonstrated in the above inventive examples. Aqueous polyamide resin dispersion would be expected to perform comparably in preventing settling of water insoluble particulates and in maintaining viscosity in combination with other water-based acrylics, such as, for example, the commercially available Joncryl® 77, Joncryl® 80, Joncryl® 89, Lucidene™ 605, Joncryl® 585, Joncryl® 624, Vancryl® 989, Lucidene™ 351, Vancryl® K762, Joncryl® 537, NeoCryl® BT-101 and NeoCryl® A-1127, among others.

The finished inks of the present application are suitable for application by printing methods such as flexographic, gravure, lithographic, screen, and digital.

Example 26 and Comparative Example 27

Water-Based Phosphorescent Printing Inks

Water-based inks were prepared from the following base composition that includes a phosphorescent pigment:

TABLE 9

| Component | Wt % |
| --- | --- |
| BASF LMV 7040 acrylic emulsion | 15.8 |
| Silicone Defoamer | 0.2 |
| BASF JONCRYL LMV7050 acrylic emulsion | 9.8 |
| Defoamer | 1.8 |
| Tap Water | 15.3 |
| UVEDA GAF-2G Phosphorescent Pigment | 50.0 |
| Clay compound | 0.6 |
| Propylene Glycol | 2.0 |
| PE wax compound | 3.0 |
| Surfactant | 1.5 |
| TOTAL | 100 |

Example 26 was prepared from the base composition by adding 10.0 wt % Snowpack™ 2362A to 90.0 wt % base composition. Viscosity=420 cps.

Comparative Example 27 was prepared from the base composition by adding 10.0 wt % Joncryl® LMV 7040 to 90.0 wt % base composition. Viscosity=411 cps. Joncryl® LMV 7040 is a pH stable acrylic emulsion.

Example 26 and Comparative Example 27 were mixed for 5 minutes, placed in sealed containers, and left undisturbed at 70° F. for 100 days.

After 100 days, the percentage of settled solid material and supernatant were measured. An ink knife was used to stir the settled solid material into a homogeneous ink.

TABLE 10

| | Depth/Percent settled | Depth/Percent Supernatant | Qualitative description of settled portion |
| --- | --- | --- | --- |
| Example 26 | 11 mm 50.0% | 11 mm 50.0% | Soft settle, easily mixed with knife. Ink composition is easily re-homogenized |
| Comparative Example 27 | 6 mm 30.0% | 14 mm 70.0% | Hard packed solid material, extremely difficult to mix with knife |

Example 28 and Comparative Example 29

Water-Based Varnish Containing Calcium Carbonate

Water-based inks were prepared from the following base composition that includes calcium carbonate:

TABLE 11

| Component | % (Wt) |
| --- | --- |
| JONCRYL 1698 acrylic emulsion | 5.27 |
| CALCIUM CARB 50% BASE in Solution Resin | 71.93 |
| Silicone defoamer | 0.14 |
| UREA Solution in water (50%) | 6.42 |
| Defoamer | 0.55 |
| WAX Emulsion | 2.41 |
| Solution FUMERIC VARNISH | 9.28 |
| Tap Water | 4.00 |
| TOTAL | 100.00 |

Example 28 was prepared from the base composition by adding 7.0 wt % Snowpack 2362A to 93.0 wt % base composition. Viscosity 510 cps.

Comparative Example 29 was prepared from the base composition by adding 7.0 wt % Joncryl® 1698 to 93.0 wt % base composition. Viscosity 548 cps.

Example 28 and Comparative Example 29 were mixed for 5 minutes, then placed on a shelf and maintained at 70° F. and left undisturbed for 100 days.

At the end of 100 days, the percentage of settlement and supernatant were measured. An ink knife was then used to stir the settlement into a homogeneous ink. Results are reported in Table 12.

TABLE 12

| | Depth/Percent settled | Depth/Percent Supernatant | Qualitative description of settled portion |
| --- | --- | --- | --- |
| Example 28 | 32 mm 62.70% | 19 mm 37.3% | Soft settle, easily mixed with knife. |
| Comparative Example 29 | 32 mm 56.1% | 25 mm 45.9% | Heavy settle, difficult to mix with knife |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A water-based varnish comprising:
an aqueous polyamide resin dispersion, and
a water-insoluble particulate material,
wherein the polyamide resin dispersion has a renewable carbon content of ≥50%,
wherein the polyamide resin dispersion has an average particle size of 0.15 microns to 0.40 microns; and
wherein the presence of the polyamide resin reduces settling of the water-insoluble particulate material in the varnish.

2. The water-based varnish of claim 1, further comprising an acrylate polymer.

3. The water-based varnish of claim 1, wherein the polyamide resin is soluble in alcohol or a co-solvent blend of alcohol and a hydrocarbon.

4. The water-based varnish of claim 3, wherein the alcohol is a $C_2$ to $C_6$ alcohol.

5. The water-based varnish of claim 1, wherein the aqueous polyamide resin dispersion has a solids content of 30 wt % to 60 wt %.

6. The water-based varnish of claim 1, wherein the aqueous polyamide resin dispersion has a pH at 25° C. of 6.5 to 9.5.

7. The water-based varnish of claim 1, wherein the aqueous polyamide resin dispersion has a viscosity of 300 cps to 20,000 cps.

8. The water-based varnish of claim 1, wherein the aqueous polyamide resin dispersion has an average particle size of 0.20 microns to 0.40 microns.

9. The water-based varnish of claim 1, wherein the water-insoluble particulate material is selected from a polysaccharide, calcium carbonate, and mixtures thereof.

10. The water-based varnish of claim 9, wherein the polysaccharide is a starch.

11. The water-based varnish of claim 10, wherein the starch is an oxidized starch.

12. The water-based varnish of claim 1, wherein the polyamide resin dispersion has a renewable carbon content of 50 wt % to 99 wt %.

13. The water-based varnish of claim 1, wherein the renewable carbon content is based on the total carbon present in a sample of the aqueous polyamide resin dispersion, and wherein the amount of renewable carbon is as determined in accordance with ASTM D6866-18 Method B (AMS) using NIST Standard Reference Material (SRM) 4990C.

14. A water-based ink comprising the varnish of claim 1, and a colorant.

15. The water based ink of claim 14, wherein the colorant is a phosphorescent pigment.

16. The water-based ink of claim 14, wherein the ink maintains a reduced print viscosity of 18/seconds to 60/seconds for at least 70 days.

17. The water-based ink of claim 14, wherein the colorant is an acrylic pigment dispersion.

18. The water-based ink of claim 14, wherein the ink is suitable for flexographic or gravure printing.

19. The water-based varnish of claim 1, wherein the varnish is substantially free of settling for at least 14 days.

20. A printed article comprising a substrate printed with the water-based varnish of claim 1.

* * * * *